United States Patent [19]
Atsuta

[11] Patent Number: 6,037,701
[45] Date of Patent: *Mar. 14, 2000

[54] VIBRATION TYPE ACTUATOR APPARATUS

[75] Inventor: Akio Atsuta, Yokosuka, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/714,598

[22] Filed: Sep. 16, 1996

[30] Foreign Application Priority Data

Sep. 18, 1995 [JP] Japan .................................. 7-238399

[51] Int. Cl.⁷ .................................................. H01L 41/08
[52] U.S. Cl. ................ 310/316.01; 318/116; 310/316.02
[58] Field of Search ..................... 310/323, 316, 310/317; 318/116

[56] References Cited

U.S. PATENT DOCUMENTS

| | | | |
|---|---|---|---|
| 4,713,571 | 12/1987 | Suzuki et al. | 310/316 |
| 4,853,579 | 8/1989 | Kawasaki et al. | 310/116 |
| 4,888,514 | 12/1989 | Takahashi et al. | 310/316 |
| 4,914,336 | 4/1990 | Yamasaki | 310/316 |
| 5,134,333 | 7/1992 | Atsuta | 310/323 |
| 5,153,486 | 10/1992 | Hirotomi | 318/116 |
| 5,173,631 | 12/1992 | Suganuma | 310/316 |
| 5,192,889 | 3/1993 | Myohga | 310/316 |
| 5,231,325 | 7/1993 | Tamai et al. | 310/323 |
| 5,247,221 | 9/1993 | Atsuta | 310/323 |
| 5,300,850 | 4/1994 | Okumura et al. | 310/323 |
| 5,365,139 | 11/1994 | Kasuga | 310/316 |
| 5,438,229 | 8/1995 | Ohtsuchi et al. | 310/316 |
| 5,477,099 | 12/1995 | Suganuma | 310/316 |
| 5,612,598 | 3/1997 | Fukui et al. | 318/116 |
| 5,616,979 | 4/1997 | Nishikawa | 310/316 |
| 5,631,516 | 5/1997 | Kataoka | 310/316 |

FOREIGN PATENT DOCUMENTS

| | | | |
|---|---|---|---|
| 0450962 | 9/1991 | European Pat. Off. | 310/323 |
| 3-289375 | 12/1991 | Japan . | |

*Primary Examiner*—Mark O. Budd
*Attorney, Agent, or Firm*—Fitzpatrick, Cella, Harper & Scinto

[57] ABSTRACT

A vibration type actuator apparatus which obtains a driving force by applying a cyclic signal to a piezoelectric member to excite a vibration member, includes an apparatus which obtains driving amount or position information of a target object driven by the apparatus by accumulating the output from the piezoelectric member.

10 Claims, 9 Drawing Sheets

VIBRATION TYPE ACTUATOR APPARATUS

BACKGROUND OF THE INVENTION

1. Field of the Invention

The present invention relates to a vibration type actuator.

2. Related Background Art

A vibration type actuator apparatus or a vibration type (vibration wave) motor, which generates surface acoustic wave vibrations, using an electro-mechanical energy conversion element such as a piezoelectric element, attached to a vibration member, on the surface of the vibration member, and converts the vibration energy of the vibration member into a continuous mechanical motion, has already been put into practical applications such as a driving motor for an optical equipment such as a camera by the present applicant.

A bar-shape vibration type (vibration wave) motor developed by the present applicant and built in an optical equipment will be described below as prior art associated with the present invention.

Figure 9:
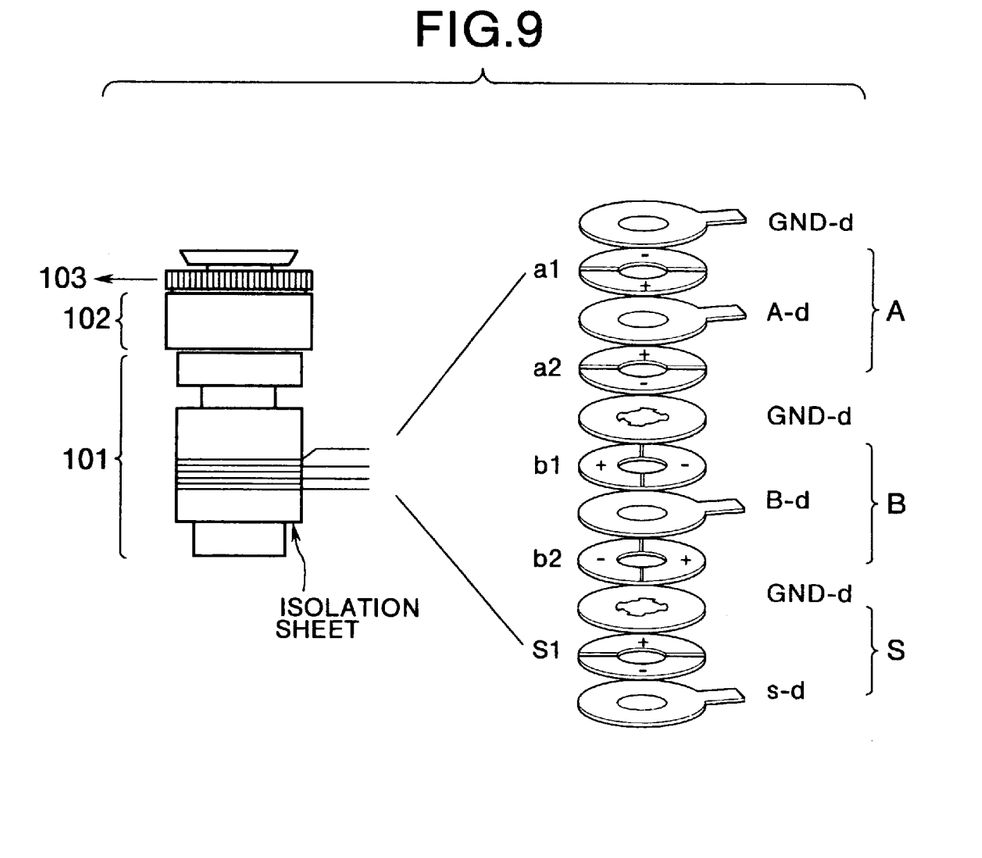
FIG. 9 is a view showing the mechanical structure of a conventional bar-shape vibration wave motor, and the layout of wiring lines for supplying voltages to and picking up the output voltage from piezoelectric elements arranged in the motor.
Figure 10:
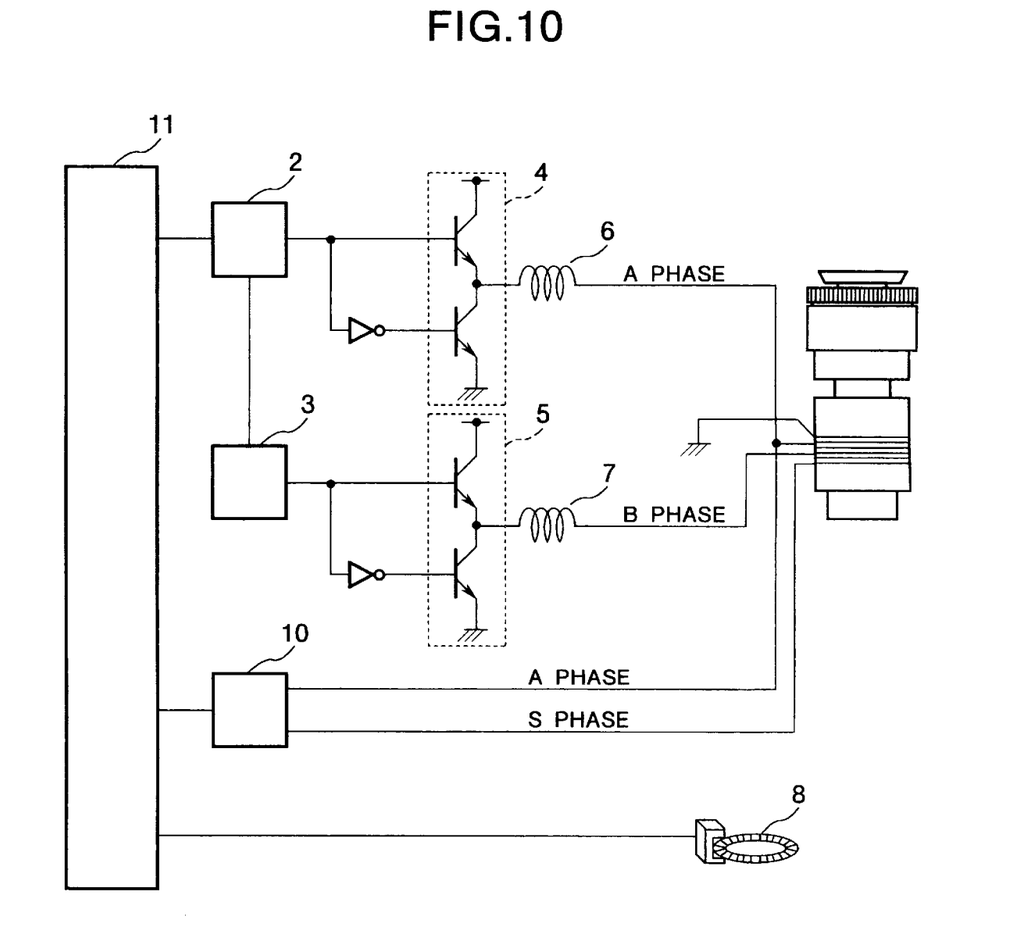
FIG. 10 is a block diagram showing a conventional circuit.

FIGS. 9 and 10 respectively show the mechanical structure and the electrical arrangement of the bar-shape vibration wave motor. Referring to FIG. 9, a vibration member 101 of the motor is formed by sandwiching groups of annular piezoelectric elements (groups of electro-mechanical energy conversion elements) at the middle portion of a vibration member main body also consisting of a thick, metal cylindrical member. When alternating voltages with different phases are applied to the groups of piezoelectric elements, a local elliptic motion is generated on the distal end face of the vibration member 101. The piezoelectric elements sandwiched in the vibration member main body include groups of A and B phase piezoelectric elements (groups of electro-mechanical energy conversion elements for driving) to which first and second alternating voltages are applied to generate the local elliptic motion on the distal end face of the vibration member 101, and a vibration detection piezoelectric element S (a mechano-electro energy conversion element for detection) for detecting the vibrating state of the vibration member 101.

A rotary member (rotor) 102 serving as a movable member is in press-contact with the distal end face of the vibration member 101, and is rotated by surface acoustic wave vibrations generated on the distal end face of the vibration member. An output gear 103 is coupled to the rotor 102. Note that + and − in the piezoelectric elements in FIG. 9 indicate the polarities of the polarization process.

Note that the operation principle of this vibration wave motor is disclosed in, e.g., Japanese Laid-Open Patent Application No. 3-289375 and the like, and a detailed description thereof will be omitted.

A piezoelectric element portion of the vibration member portion 101 is constituted by A phase piezoelectric elements a1 and a2 and B phase piezoelectric elements b1 and b2, which are used for driving, and a vibration detection piezoelectric element S1. The piezoelectric elements are driven by applying an A phase application cyclic voltage to a metal plate (A-d) sandwiched between the A phase piezoelectric elements a1 and a2, and a B phase application cyclic voltage (which has a phase different from that of the A phase application cyclic voltage signal) to a metal plate (B-d) sandwiched between the B phase piezoelectric elements b1 and b2. The outer surfaces of the A phase piezoelectric elements a1 and a2 and the B phase piezoelectric elements b1 and b2 are set at the GND potential by means of metal plates (GND-d). At this time, metal plates present between the elements a2 and b1 and between the elements b2 and S1 are set at the GND potential since they are in contact with a metal bolt (not shown) extending through the vibration member 101. Likewise, one surface (the B phase side in FIG. 9) of the vibration detection piezoelectric element S1 is set at the GND potential, and a signal is picked up from the opposite surface. The signal pickup surface side of the vibration detection piezoelectric element S1 contacts a metal block, which is insulated from the GND potential by an insulation sheet. Hence, the vibration detection piezoelectric element S1 can generate an output voltage corresponding to the detected vibrations. A resonance frequency and the like are calculated on the basis of the magnitude of the output voltage, the phase differences between the output voltage and driving voltages, and the like.

FIG. 10 shows a driving circuit when such vibration wave motor is used.

An oscillator 2 generates an alternating voltage, and is connected to a 90° phase shifter 3. Switching circuits 4 and 5 switch the power supply voltage using alternating voltages supplied from the oscillator 2 and the phase shifter 3. Booster coils 6 and 7 amplify pulse voltages switched by the switching circuits 4 and 5. A phase difference detector 10 detects a signal phase difference $\phi$ between a driving electrode A-d and a vibration detection electrode S-d.

A control microcomputer 11 serves as control means. The microcomputer 11 sets a driving frequency, and the vibration wave motor is driven based on the set frequency.

A position detector (e.g., an encoder) 8 detects the position of the motor. The control microcomputer 11 obtains position information on the basis of the signal output from the position detector 8, and controls the motor to stop at an appropriate position. With this control, the motor can stop at a predetermined position.

As can be seen from the above-mentioned prior art, the vibration type actuator apparatus or the vibration wave motor requires a position sensor such as an encoder when the rotational speed upon driving the movable member which is in press-contact with the upper portion of the vibration member by friction is to be checked or when the movable member is to be stopped at a specific position, resulting in high cost and an extra space for mounting the position sensor.

SUMMARY OF THE INVENTION

One aspect of the application has as its object to obtain position or driving amount information without arranging any mechanical detection means such as an encoder, and is to provide an apparatus which obtains position or driving amount information by detecting a signal output from a signal forming portion which is arranged on a vibration member and generates a signal in correspondence with a vibrating state. One aspect of the application is to provide, under the above-mentioned object, an apparatus which obtains the position or driving amount information by accumulating signals output from the signal forming portion. One aspect of the application is to provide, under the above-mentioned object, an apparatus which obtains the position or driving amount information on the basis of the output from a mechano-electro energy conversion element portion disposed on a vibration member, and performs frequency regulation by utilizing the output from the element portion. One aspect of the application is to provide, under the above-mentioned object, an apparatus which obtains the position or driving amount information by detecting a mechanical arm current flowing through the actuator apparatus.

Other objects of the present invention will become apparent from the following description of the embodiments taken in conjunction with the accompanying drawings.

DESCRIPTION OF THE EMBODIMENT OF THE INVENTION (First Embodiment)

Figure 1:
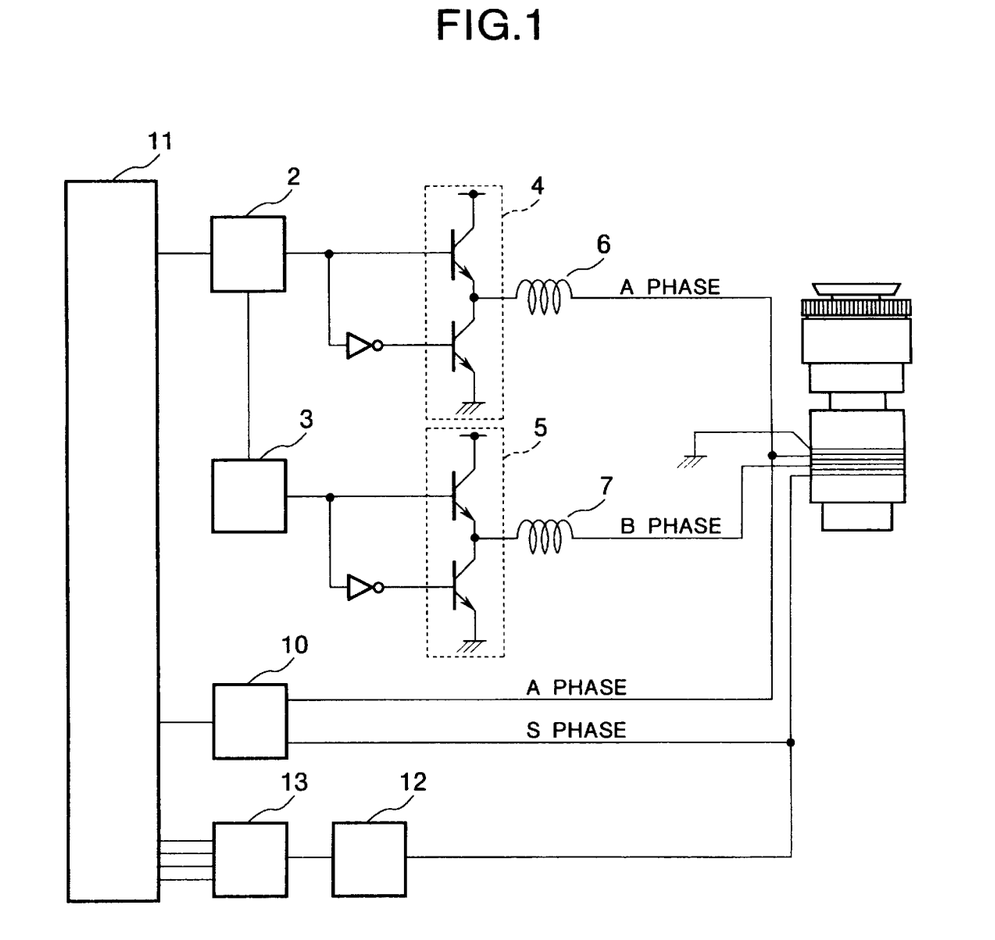
FIG. 1 is a block diagram of a circuit according to the first embodiment of the present invention.

FIG. 1 is a block diagram showing a driving circuit having a position detection means of a bar-shape vibration wave motor as an actuator apparatus of this embodiment. The same reference numerals in FIG. 1 denote the same parts as in the conventional circuit. Note that the mechanical structure is the same as that shown in FIG. 9.

In this embodiment, a rectifying means 12 which rectifies a signal output from a vibration detection piezoelectric element S and outputs a signal corresponding to the amplitude of the output signal, and a sample means 13 (e.g., an A/D converter) which samples the signals output from the rectifying means 12 at a cycle determined by a microcomputer 11 and outputs the sampled signal to the microcomputer 11 are arranged.

Figure 2:
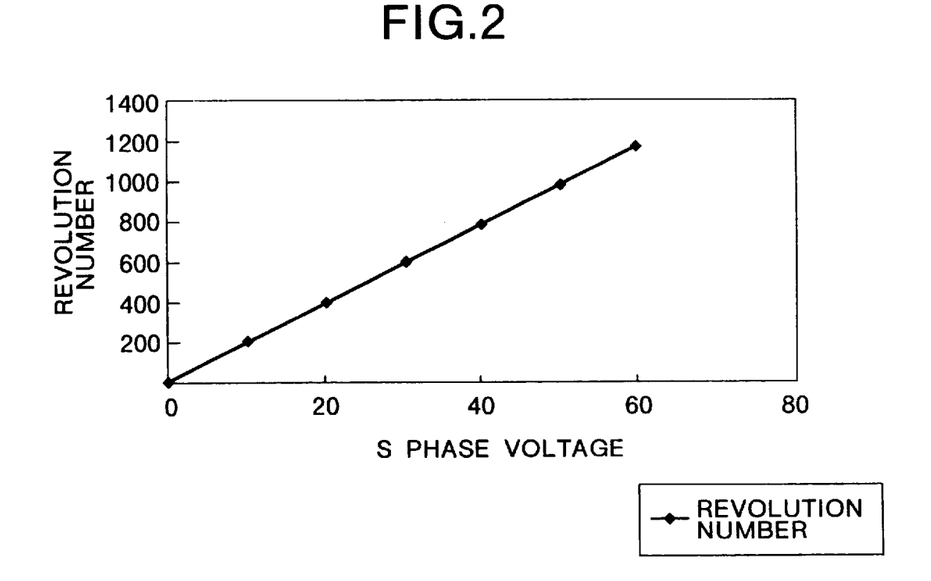
FIG. 2 is an explanatory view showing the relationship between the magnitude of the S phase voltage and the revolution number of a bar-shape vibration wave motor.

FIG. 2 shows the relationship between the magnitude of a signal output from the vibration detection piezoelectric element S and the revolution number of the bar-shape vibration wave motor. As can be seen from FIG. 2, the magnitude of a signal output from the vibration detection piezoelectric element S and the revolution number have a nearly linear relationship therebetween.

Figure 3:
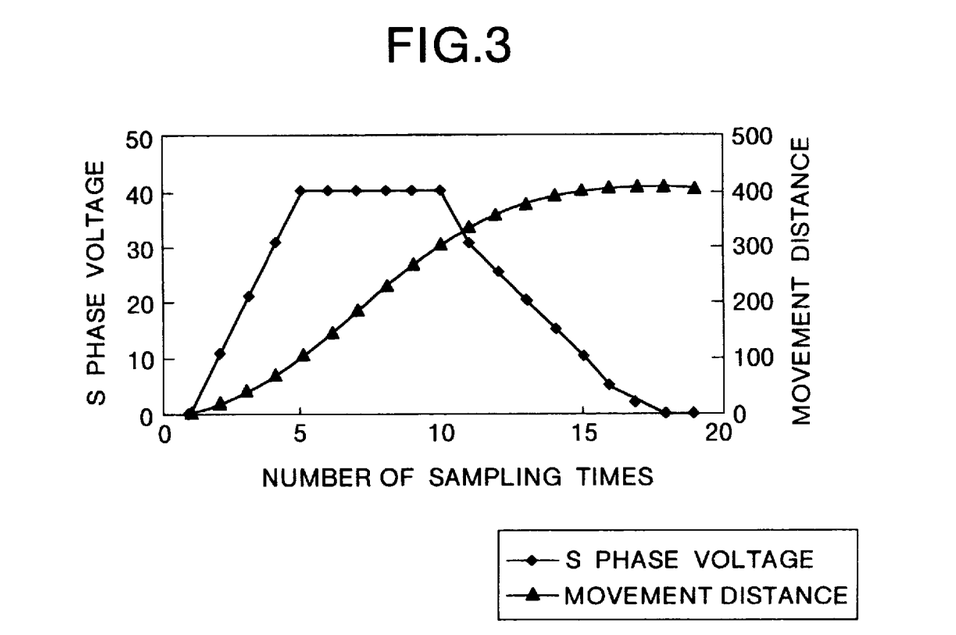
FIG. 3 is an explanatory view showing the relationship between the magnitude of the S phase voltage and the movement distance.

FIG. 3 shows the magnitudes of signals of the vibration detection piezoelectric element S obtained when the microcomputer 11 samples signals output from the vibration detection piezoelectric element S at given timings, and the accumulation result of the signals.

The microcomputer 11 resets the accumulation result to zero and drives the motor using the driving circuit when it is started. The microcomputer 11 acquires the magnitudes of signals of the rectifying means 12 from the sample means 13 (e.g., an A/D converter) at predetermined time intervals, and adds up (accumulates) the data sampled by the sample means. At this time, since the magnitude of the signal output from the vibration detection piezoelectric element S and the revolution number have a nearly linear relationship therebetween, as shown in FIG. 2, the accumulation result can be used as the position information, as shown in FIG. 3. Hence, the microcomputer 11 can perform positioning control utilizing the accumulation result.

(Second Embodiment)

Figure 4:
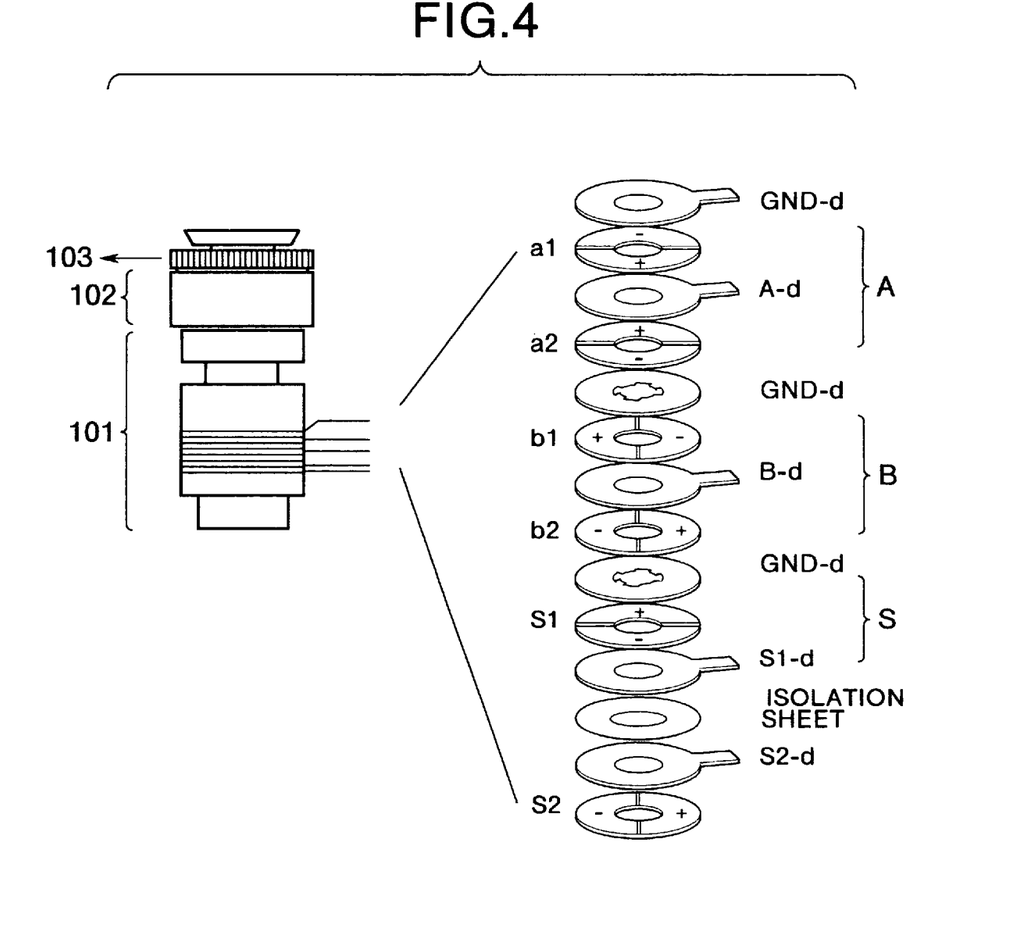
FIG. 4 is a view showing the mechanical structure of a bar-shape vibration wave motor according to the second embodiment of the present invention, and the layout of wiring lines for supplying voltages to and picking up the output voltage from piezoelectric elements arranged in the motor.

FIG. 4 shows the mechanical structure of a bar-shape vibration wave motor according to the second embodiment of the present invention, the electrode patterns of piezoelectric elements arranged in the motor, and electrode plates for supplying and picking up voltages to and from the piezoelectric elements. In FIG. 4, a second detection piezoelectric element S2 is added to the arrangement shown in FIG. 9. Note that electrodes S1-d and S2-d are output voltage pickup electrodes of the detection piezoelectric elements S1 and S2. An isolation sheet is disposed between these electrodes, so that the outputs from the elements S1 and S2 are independently picked up.

Figure 5:
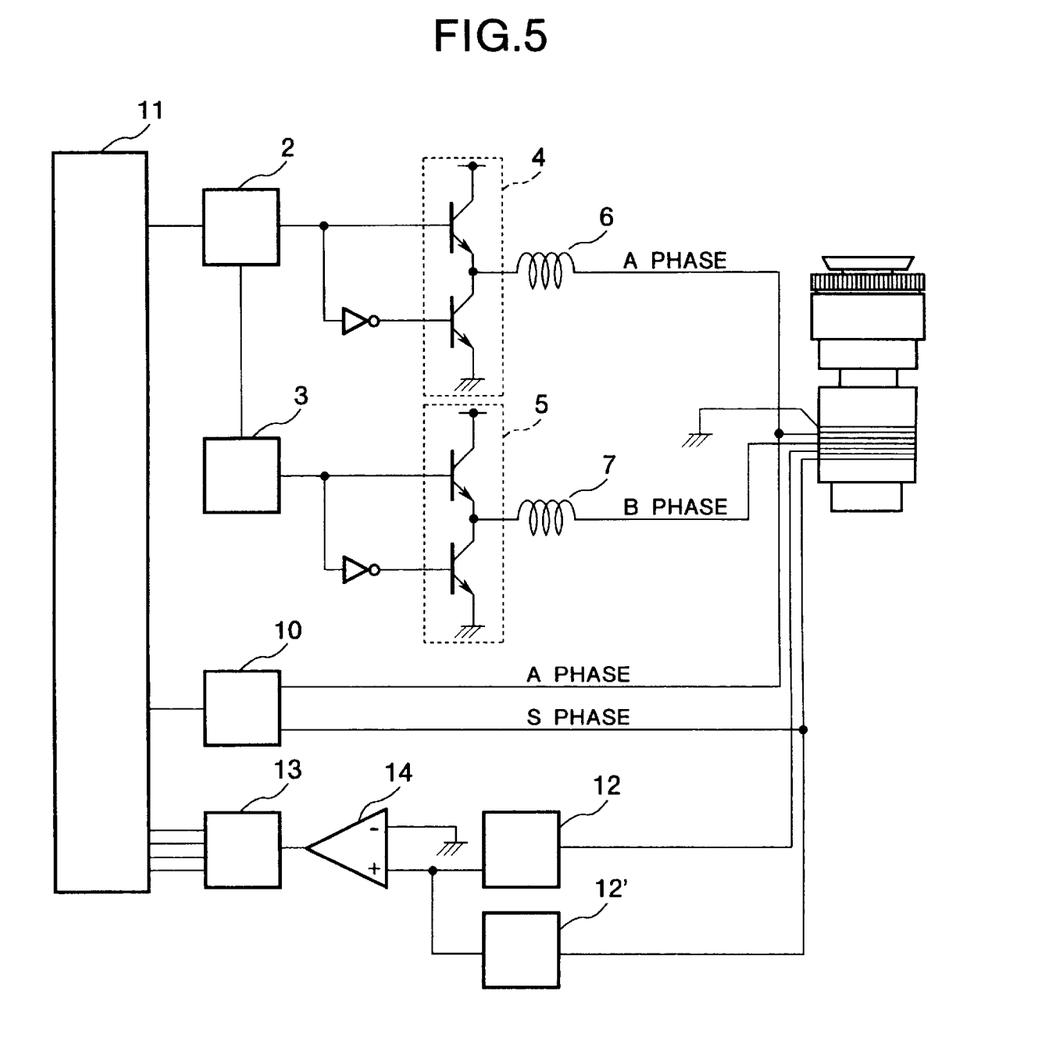
FIG. 5 is a block diagram showing a circuit according to the second embodiment of the present invention.

FIG. 5 is a block diagram of a circuit of the vibration wave motor according to the second embodiment of the present invention. In this embodiment, a rectifying means 12' which rectifies a signal output from the other vibration detection piezoelectric element S2 and an adder 14 which adds the output from the rectifying means 12 that rectifies a signal output from the piezoelectric element S1 and the output from the rectifying means 12' are arranged.

Normally, the slide surface of a rotor used in the vibration wave motor has an axially symmetrical shape (the perimeter has two projections at opposing positions that are 180° apart from each other, and two recesses at positions shifted therefrom by 90°) due to limitations in the manufacturing process. At this time, when one vibration detection piezoelectric element S is arranged, the magnitude of the signal output from the rectifying means varies depending on whether the projection or recess reaches the vibration direction detected by the vibration detection piezoelectric element S, and errors are generated in position information as the accumulation result.

In this embodiment, a plurality of vibration detection piezoelectric elements S (S1 and S2) are arranged, and the directions of vibrations to be detected by these elements are offset by 90°. With this arrangement, the rectification results of the signals outputs from the elements S1 and S2 are added and accumulated, and the accumulation result is used as the position information, thus allowing accurate position detection independently of the projections and recesses on the rotor.

(Third Embodiment)

Figure 6:
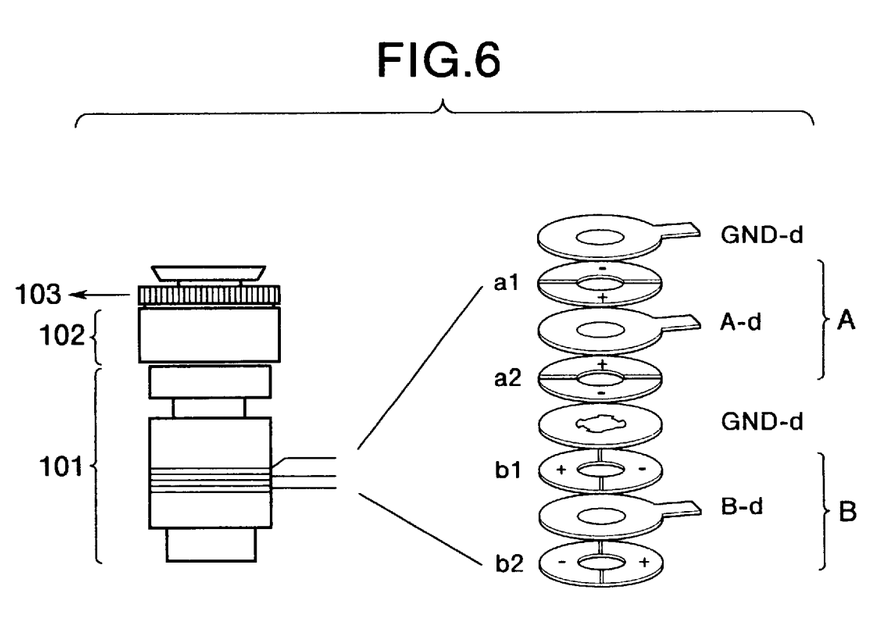
FIG. 6 is a view showing the mechanical structure of a bar-shape vibration wave motor according to the third embodiment of the present invention, and the layout of wiring lines for supplying voltages to and picking up the output voltage from piezoelectric elements arranged in the motor.

FIG. 6 shows the mechanical structure of a bar-shape vibration wave motor according to the third embodiment of the present invention, the electrode patterns of piezoelectric elements arranged in the motor, and electrode plates for supplying and picking up voltages to and from the piezoelectric elements. In this embodiment, the magnitude of a mechanical arm current flowing through the motor is integrated to obtain position information in place of the vibration detection piezoelectric element. Hence, no vibration detection piezoelectric element is arranged.

Figure 7:
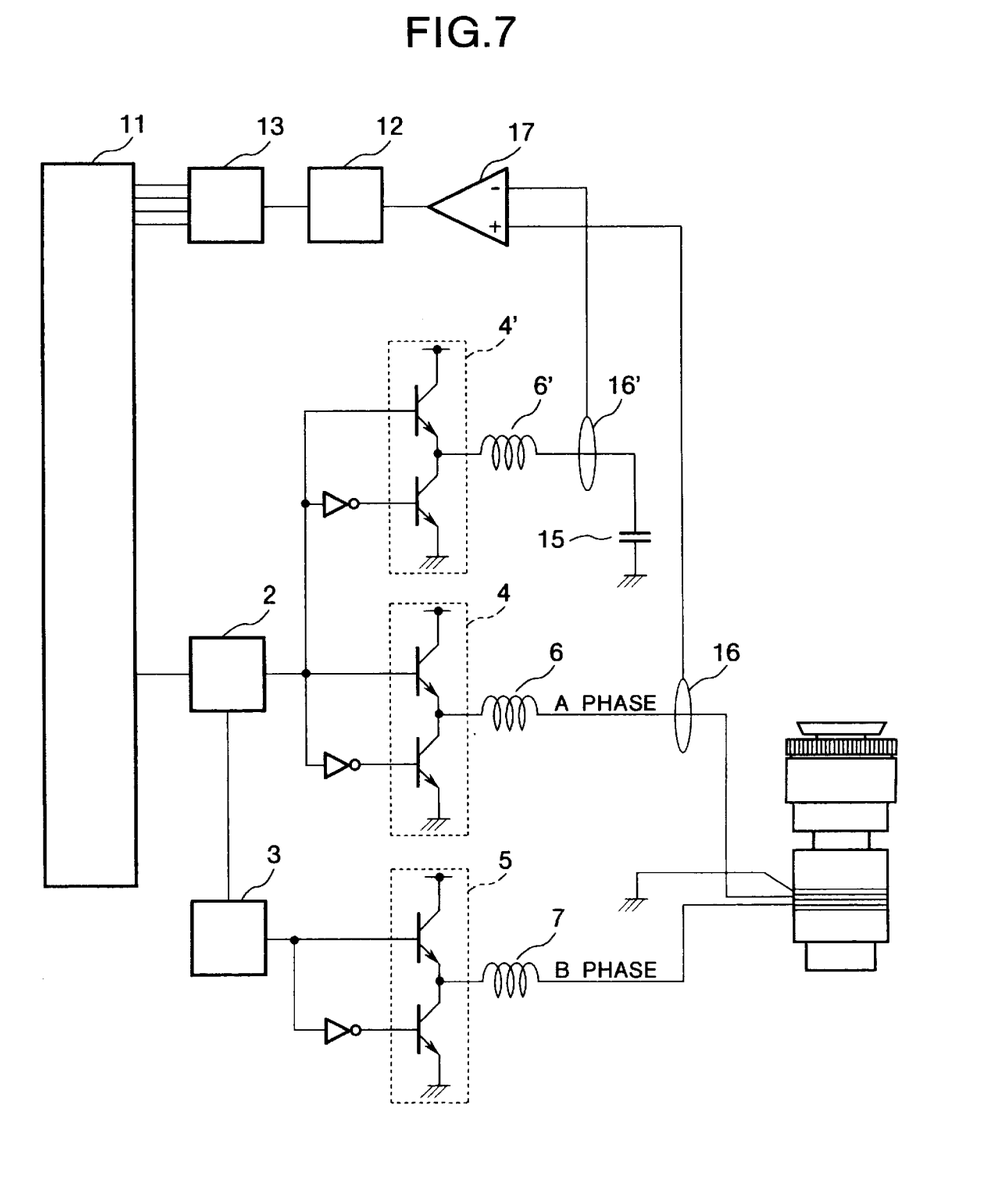
FIG. 7 is a block diagram showing a circuit according to the third embodiment of the present invention.

FIG. 7 is a block diagram of a circuit of the vibration wave motor according to the third embodiment of the present invention. In this embodiment, a current detection means 16 which detects a current flowing through the motor, a current detection means 16' which detects a current flowing through a mechanical arm current detection dummy capacitive element 15 (having the same capacitance as that of the driving piezoelectric element), and a differential amplifier 17 which calculates the difference between the outputs from the two current detection means are arranged, and the output signal from the amplifier 17 is connected to the rectifying means 12.

The magnitude of the mechanical arm current and the revolution number have a nearly linear relationship therebetween as in the output voltage from the vibration detection piezoelectric element. Therefore, by accumulating the magnitude of the mechanical arm current flowing through the motor, the position information can be obtained as in the first embodiment. Note that the magnitude of the mechanical arm current and the revolution number have a linear relationship therebetween, as described above, but the current detection means 16 cannot directly detect this arm current, and a current including a current flowing through the capacitance of the piezoelectric element is detected. Therefore, the current flowing through the capacitance is formed using the element 15 or the like as a dummy element, and the arm current is picked up via the differential amplifier 17.

In the above embodiments, the bar-shape vibration wave motor has been exemplified. However, the present invention may be applied to a vibration wave motor other than the bar-shape type motor as long as it uses two or more vibration modes.

Figure 8:
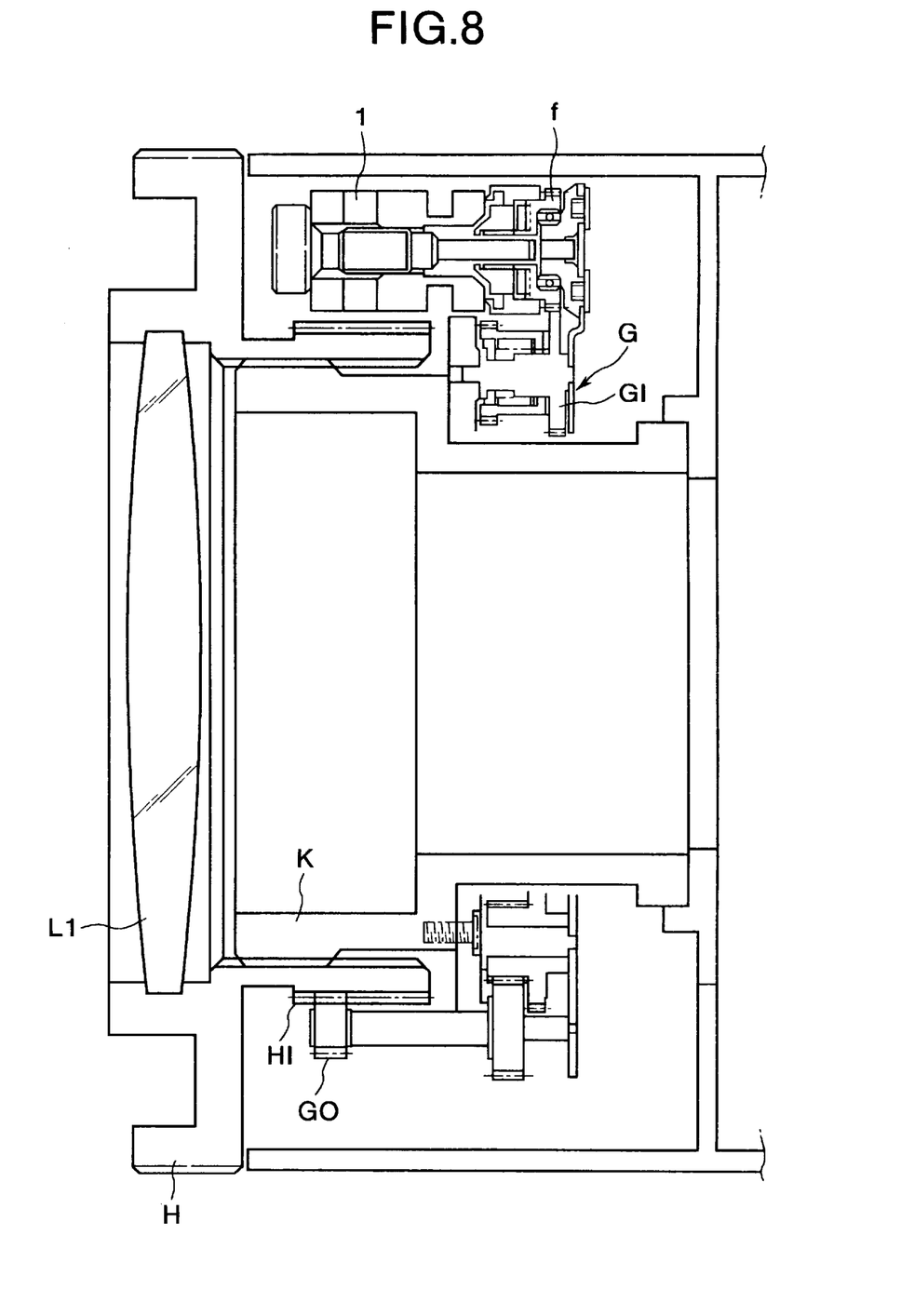
FIG. 8 is a view showing an example of a driving apparatus that adopts the bar-shape vibration wave motor according to the present invention.

FIG. 8 shows a driving device using the vibration wave motor described in each of the above embodiments.

A gear f assembled integrally with the motor meshes with an input gear GI of a gear transmission mechanism G, and its output gear GO meshes with a gear HI formed on a lens holding member H that holds a lens L1. The lens holding member H is helicoidally coupled to a stationary cylinder K, and is rotated via the gear transmission mechanism G by the driving force of the vibration wave motor, thus attaining a focusing operation.

In each of the above embodiments, data added (accumulated) by the microcomputer 11 is compared with, e.g., a target driving amount or position data, and the driving frequency of the motor is suppressed or motor driving stop control is performed on the basis of the comparison result, thus executing position control.

What is claimed is:

1. A vibration type actuator device or an apparatus having the device, wherein an electro-mechanical energy conversion element is disposed at an elastic member, and a cyclic signal is applied to the energy conversion element to excite a vibration in the elastic member, thereby to generate a driving force for driving an object at a driving speed, the device or the apparatus comprising:

a mechano-electric energy conversion element, disposed at the elastic member, which generates an output signal in response to a vibration in the elastic member, said output signal varying in accordance with the driving speed of the actuator device; and a position information forming circuit, connected to the output of the mechano-electric energy conversion element, which generates position information of the object or driving amount information of the object based on the output signal from said mechano-electric energy conversion element.

2. A device or apparatus according to claim 1, wherein said position information forming circuit comprises an accumulation circuit which accumulates a signal corresponding to the output signal from said mechano-electric energy conversion element, and generates the position information or the driving amount information on the basis of a value accumulated by said accumulation circuit.

3. A device or apparatus according to claim 1, further comprising:

a phase difference detection circuit which detects a phase difference between the output signal from said mechano-electric energy conversion element and the cyclic signal applied to said electro-mechanical energy conversion element, and a frequency regulation circuit which regulates a frequency of the cyclic signal applied to said electro-mechanical energy conversion element in accordance with the phase difference detected by said phase difference detection circuit.

4. A vibration type actuator device or an apparatus having the device, wherein an electro-mechanical energy conversion element is disposed at an elastic member, and a cyclic signal is applied to the energy conversion element to excite a vibration in the elastic member, thereby to generate a driving force for driving an object at a driving speed, the device or the apparatus comprising:

a current detecting portion responsive to a current that flows through said electro-mechanical energy conversion element, said current detecting portion generating a current output value corresponding to the driving speed of the actuator device; and a position information forming circuit, connected to the output of said current detecting portion, which generates position information of the object or driving amount information of the object in accordance with the current output value generated by said current detecting portion.

5. A device or apparatus according to claim 4, wherein said position information forming circuit comprises a subtraction circuit which performs a subtraction between the current output value generated by said current detecting portion and a current value which flows through a capacitance portion of said electro-mechanical energy conversion element, and generates the position information or driving amount information based on a difference calculated by said subtraction circuit.

6. A device or apparatus according to claim 4, wherein said position information forming circuit comprises an accumulation circuit which accumulates the current output value generated by said current detecting portion, and generates the position information or driving amount information based on a value accumulated by said accumulation circuit.

7. A vibration type actuator device or an apparatus having the device, wherein an electro-mechanical energy conversion element is disposed at an elastic member, and a cyclic signal is applied to the energy conversion element to excite a vibration in the elastic member, thereby to generate a driving force for driving an object, the device or the apparatus comprising:

a current detecting portion, responsive to a current flowing through the actuator device, and generating a mechanical arm output current value, said mechanical arm output current value corresponding to a driving speed of the actuator device; and a position information forming circuit, connected to the output of said current detecting portion, which generates position information of the object or driving amount information of the object in accordance with the mechanical arm output current value generated by said current detecting portion.

8. A device or apparatus according to claim 7, wherein said position information forming circuit comprises an accumulation circuit which accumulates the mechanical arm output current value generated by said current detecting portion, and generates the position information or driving amount information on the basis of a value accumulated by said accumulation circuit.

9. A vibration type actuator device or an apparatus having the device, wherein an electro-mechanical energy conversion element is disposed at an elastic member, and a cyclic signal is applied to the energy conversion element to generate a vibration in the elastic member, thereby to generate a driving force for driving an object at a driving speed, the device or the apparatus comprising:

a mechano-electric energy conversion element, disposed at the elastic member, which generates an output signal in response to a vibration in the elastic member, the output signal varying in accordance with the driving speed;

a rectifier which rectifies the output signal of said mechano-electric energy conversion element; and a position information forming circuit, connected to an output of said rectifier, which accumulates the output signal of said rectifier and generates position information of the object or driving amount information of the object based on a value of the accumulated output signal.

10. A vibration type actuator device or an apparatus having the device, wherein an electro-mechanical energy conversion element is disposed at an elastic member, and a cyclic signal is applied to the energy conversion element to generate a vibration in the elastic member, thereby to generate a driving force for driving an object at a driving speed, the device or the apparatus comprising:

a current detecting portion which detects a mechanical arm current flowing through the actuator device;

a rectifier which rectifies the mechanical arm current detected by said current detecting portion; and a position information forming circuit which accumulates the mechanical arm current rectified by said rectifier and generates position information or driving amount information of the object.

* * * * *